(12) United States Patent
Cox et al.

(10) Patent No.: US 7,995,660 B2
(45) Date of Patent: Aug. 9, 2011

(54) RECEIVER TERMINATION CIRCUIT FOR A HIGH SPEED DIRECT CURRENT (DC) SERIAL LINK

(75) Inventors: Carrie E. Cox, Cary, NC (US); Hayden C. Cranford, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 11/930,975

(22) Filed: Oct. 31, 2007

(65) Prior Publication Data
US 2009/0110084 A1  Apr. 30, 2009

(51) Int. Cl.
*H04B 1/10* (2006.01)
*H04B 3/00* (2006.01)

(52) U.S. Cl. .......................... 375/257; 375/259; 375/346

(58) Field of Classification Search .................. 375/219, 375/221, 257, 259, 340, 346
See application file for complete search history.

(56) References Cited

U.S. PATENT DOCUMENTS

| 4,377,789 | A | * | 3/1983 | Hoover | 330/253 |
| 6,654,462 | B1 | | 11/2003 | Hedberg | |
| 6,870,423 | B2 | | 3/2005 | Takauchi et al. | |
| 7,126,425 | B2 | | 10/2006 | Kimura | |
| 7,215,156 | B1 | * | 5/2007 | Li | 326/115 |
| 2004/0100309 | A1 | * | 5/2004 | Best et al. | 327/65 |
| 2006/0176074 | A1 | * | 8/2006 | Van Epps et al. | 326/30 |
| 2007/0103186 | A1 | * | 5/2007 | Clements et al. | 326/30 |

* cited by examiner

*Primary Examiner* — David B Lugo
(74) *Attorney, Agent, or Firm* — Patrick J. Daugherty; Driggs, Hogg, Daugherty & Del Zoppo Co., LPA

(57) ABSTRACT

A method for matching receiver and transmitter common-mode voltages for a high-speed direct current (DC) serial connection between the receiver and the transmitter includes measuring, at the receiver, a common-mode voltage of the transmitter. The common-mode voltage of the transmitter is an average of a voltage signal transmitted by the transmitter and received by the receiver. The method further includes comparing the common-mode voltage of the transmitter with a common-mode voltage of the receiver. The method further includes maintaining the common-mode voltage of the receiver at a first level at which the common-mode voltage of the receiver substantially matches the common-mode voltage of the transmitter.

19 Claims, 3 Drawing Sheets

RECEIVER TERMINATION CIRCUIT FOR A HIGH SPEED DIRECT CURRENT (DC) SERIAL LINK

FIELD OF THE INVENTION

The following generally relates to serial communications and, more particularly, to a receiver termination circuit for a high speed direct current (DC) serial link between a transmitter and a receiver.

BACKGROUND OF THE INVENTION

FIG. 1 illustrates a communications system 100 in which a transmitter (TX) 102 transmits data to a receiver (RX) 104 over a high-speed direct current (DC) serial link 106 via a differential driver 108. As shown, the high-speed DC serial link 106 includes differential lines for conveying differential signals $V_P$ and $V_N$ to RX 104, and RX 104 includes a differential termination network 110. For a given DC common-mode resistance termination at the RX differential termination network 108, the TX 102 common-mode voltage ($V_{TXCM}$) can be computed as the average of $V_P$ and $V_N$, or $(V_P+V_N)/2$. The RX 104 common-mode voltage ($V_{RXCM}$) 112 generally is the DC voltage value at the termination network 110, and is also referred to as $V_{RXTERM}$.

Unfortunately, a mismatch between $V_{TXCM}$ and $V_{RXCM}$ may be problematic. For instance, the high-speed DC serial link 106 may incur DC common-mode current ($I_{CM}$) when $V_{TXCM}$ and $V_{RXCM}$ do not match. The DC common-mode current $I_{CM}$ does not contribute to the differential signaling and, hence, is wasted power. In addition, the additional DC common-mode current $I_{CM}$ requires increased geometry of the wiring of the TX 102 and RX 104 input/output (I/O) to achieve a fixed reliability and/or electro-migration. Larger geometry wiring on the I/O adds parasitic capacitance, which may reduce the bandwidth of the interface. Moreover, the mismatched common-mode voltages $V_{TXCM}$ and $V_{RXCM}$ may result in an increase of common-mode noise due, for example, to mismatched rising and falling edges of the received data signal.

SUMMARY OF THE INVENTION

In one aspect, a method for matching receiver and transmitter common-mode voltages for a high-speed direct current (DC) serial connection between the receiver and the transmitter includes measuring, at the receiver, a common-mode voltage of the transmitter. The common-mode voltage of the transmitter is an average of a voltage signal transmitted by the transmitter and received by the receiver. The method further includes comparing the common-mode voltage of the transmitter with a common-mode voltage of the receiver. The method further includes maintaining the common-mode voltage of the receiver at a first level at which the common-mode voltage of the receiver substantially matches the common-mode voltage of the transmitter.

In another aspect, a high-speed direct current (DC) serial link receiver includes a serial link termination circuit that receives data serially transmitted over a high speed direct current (DC) serial link. The receiver further includes a first circuit that determines an instantaneous average voltage of the data. The receiver further includes a second circuit with a first input that receives the determined instantaneous average voltage and a second input that receives a termination voltage of the serial link termination circuit. The second circuit generates an output voltage signal based on a difference between the determined instantaneous average voltage and the termination voltage. The output voltage signal is fed back to the second input to maintain the termination voltage at the second input at a level that is substantially the same as a voltage level of the determined instantaneous average voltage at the first input.

In another aspect, a high-speed direct current (DC) serial link receiver includes a serial link termination circuit, a voltage measurement component, and voltage regulator. The voltage measurement component measures a common-mode voltage corresponding to a transmitted signal(s) received at the serial link termination circuit. The voltage regulator regulates a termination voltage of the serial link termination circuit based on the measured common-mode voltage.

BRIEF DESCRIPTION OF THE DRAWINGS

These and other features will be more readily understood from the following detailed description of various examples taken in conjunction with the accompanying drawings in which.

The drawings are merely representations and are not intended to portray specific elements. The drawings are intended for explanatory purposes and should not be considered as limiting scope.

DETAILED DESCRIPTION OF THE INVENTION

Figure 1:
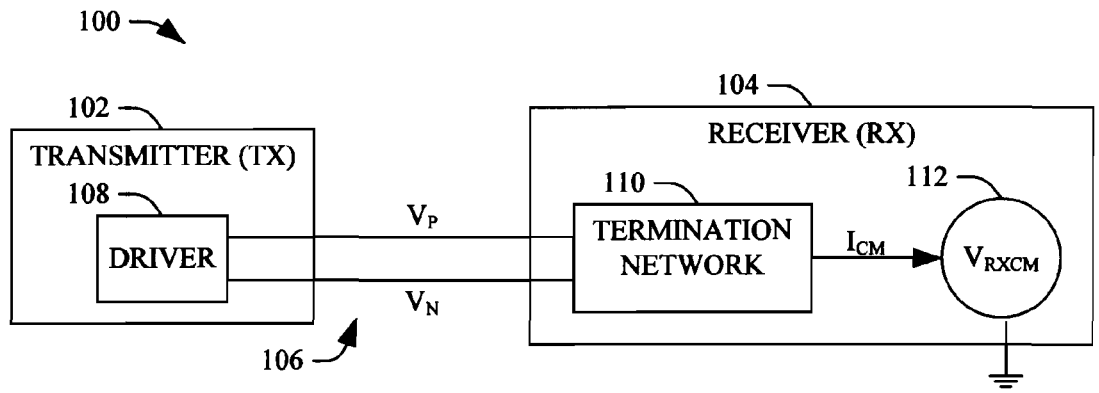
FIG. 1 illustrates a conventional communications system with a transmitter and a receiver.
Figure 2:
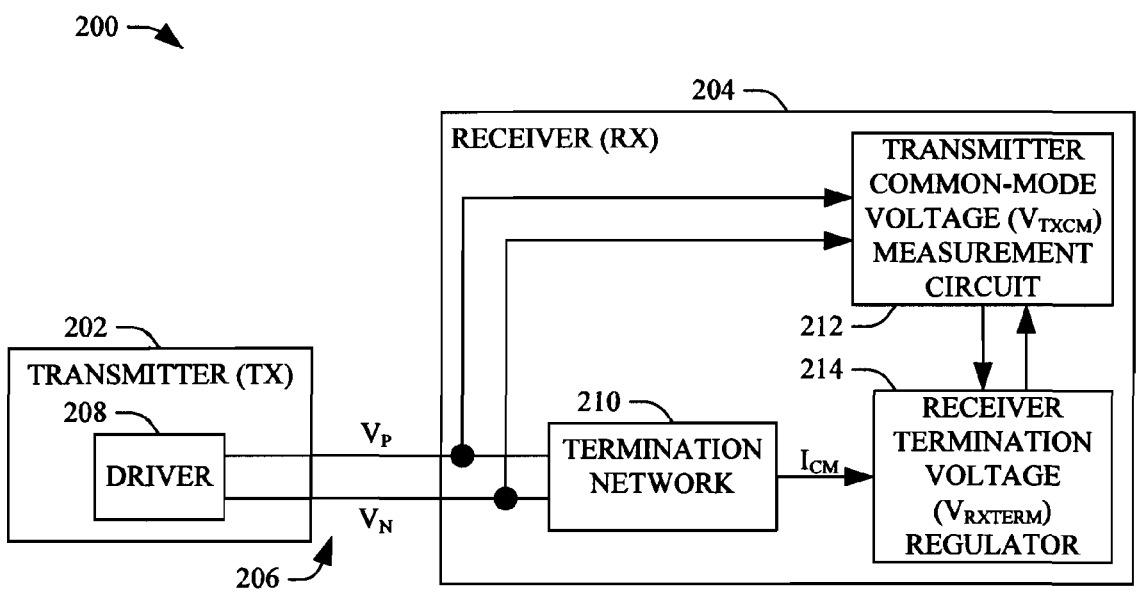
FIG. 2-4 illustrate examples of a receiver with componentry that matches the common-mode voltage of the receiver to the common-mode voltage of a transmitter.

FIG. 2 illustrates an example communications system 200. The communications system 200 includes a transmitter (TX) 202 and a receiver (RX) 204. A high-speed direct current (DC) serial link 206 couples TX 202 and RX 204 together.

In the illustrated example, TX 202 includes a differential driver 208. In other embodiments, TX 202 may alternatively include a single-ended driver. The differential driver 208 provides a positive output voltage signal ($V_P$) and a negative output voltage signal ($V_N$). $V_P$ is transmitted from TX 202 to RX 204 via a first differential line of the link 206, and $V_N$ is transmitted from TX 202 to RX 204 via a second differential line of the link 206. The receiver RX 104 includes a differential termination network 210, a transmitter common-mode voltage ($V_{TXCM}$) measurement circuit 212, and a receiver termination voltage ($V_{RXTERM}$) regulator 214. For a single-ended driver, a single-ended termination network is employed.

The $V_{TXCM}$ measurement circuit 212 measures a common-mode voltage of TX 202 ($V_{TXCM}$), and the $V_{RXTERM}$ regulator 214 compares the measured $V_{TXCM}$ with a termination, or common-mode voltage of RX 204 ($V_{RXTERM}$). The $V_{RXTERM}$ regulator 214 then regulates $V_{RXTERM}$ based on the comparison. For example, the $V_{RXTERM}$ regulator 214 regulates $V_{RXTERM}$ to match $V_{RXTERM}$ with $V_{TXCM}$.

By way of non-limiting example: if $V_{RXTERM} < V_{TXCM} - \epsilon$ (where $\epsilon$ represents a preset tolerance around $V_{TXCM}$), then the $V_{RXTERM}$ regulator 214 increases $V_{RXTERM}$; if $V_{RXTERM} > V_{TXCM} + \epsilon$, then the $V_{RXTERM}$ regulator 214 decreases $V_{RXTERM}$; and if $V_{RXTERM} \approx V_{TXCM}$ ($V_{TXCM} - \epsilon < V_{RXTERM} < V_{TXCM} + \epsilon$), then the $V_{RXTERM}$ regulator 214 neither increases nor decreases $V_{RXTERM}$. As such, the $V_{TXCM}$ measurement circuit 212 and the $V_{RXTERM}$ regulator 214 behave as a closed control loop that adjusts, if needed, $V_{RXTERM}$ based on measured $V_{TXCM}$ feedback to maintain $V_{RXTERM}$ within the preset tolerance around $V_{TXCM}$.

In one instance, the $V_{TXCM}$ measurement circuit 212 measures $V_{TXCM}$ by computing an average $V_{TXCM}$, for example, by computing an average of $V_N$ and $V_P$, or $(V_N+V_P)/2$. In this instance, the $V_{RXTERM}$ regulator 214 adjusts $V_{RXTERM}$ or maintains $V_{RXTERM}$ so that $V_{RXTERM}$ is about equal to the average $V_{TXCM}$. As a result, equilibrium is reached when the regulated $V_{RXTERM}$ equals the average $V_{TXCM}$. For balanced signaling (e.g., same number of 0's and 1's over the long term), the average of the incoming single-ended signal is the same as the average $V_{TXCM}$. As such, equilibrium is reached when the regulated $V_{RXTERM}$ is equal to the average incoming single-ended data signal.

When $V_{RXTERM} \approx V_{TXCM}$, the absolute value of the average $I_{CM} \approx 0$. As such, another approach is to measure the common-mode current $I_{CM}$ and set $V_{RXTERM}$ so that ABS $(AVG(I_{CM})) \approx 0$. In addition, when ABS$(AVG(I_{CM})) \approx 0$, the differential signaling is efficient and/or optimized with respect to at least power consumption, geometry of the wiring of the input/output (I/O) for a fixed reliability and/or electromigration, bandwidth of the interface, and common-mode noise ($V_{NCM}$) between TX 202 and RX 204. As a consequence, the $V_{NCM}$ of the signals $V_P$ and $V_N$ can be reduced and/or minimized. As such, the system may detect and subsequently set $V_{RXTERM}$ in a fashion that minimizes common-mode current $I_{CM}$ and, consequently, common-mode noise $V_{NCM}$ between links.

It is to be appreciated that the above approach can be implemented via a negative feedback loop, a finite state machine (FSM), or otherwise.

Figure 3:
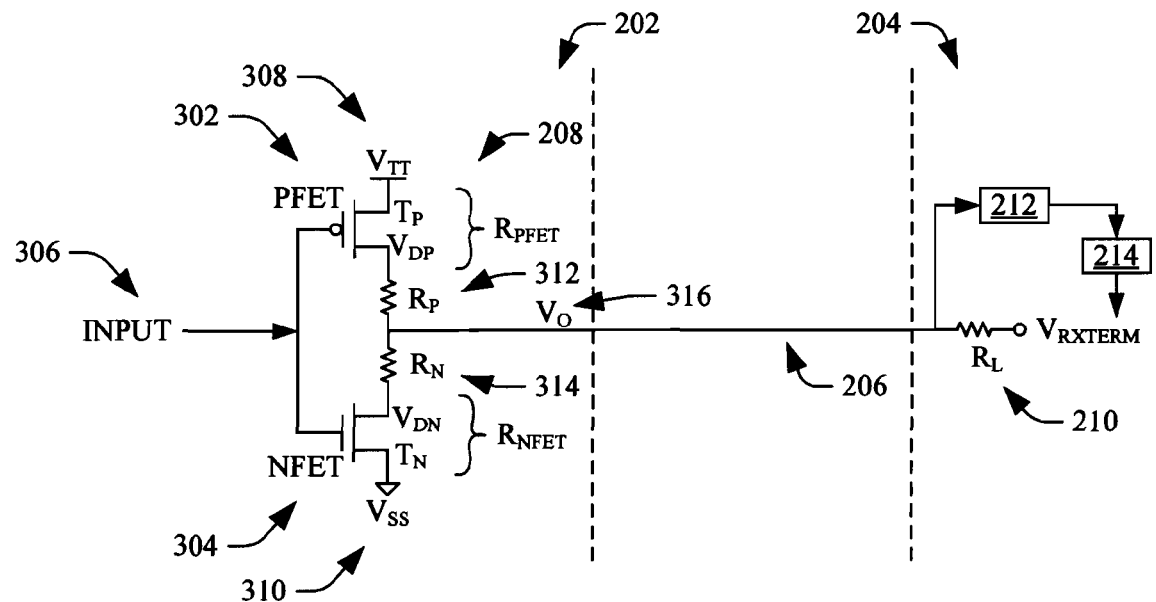

FIG. 3 illustrates an example schematic circuit for the communications system 200. In this example, the driver 208 is a single ended driver. For a differential transmitter, one single-ended driver may be used to drive each of the transmitter's differential outputs with complementary outputs.

As shown, TX 202 includes two field effect transistors (FET's), a positive field effect transistor (PFET) 302 and a negative field effect transistor (NFET) 304. The PFET 302 has equivalent impedance $R_{PFET}$, and the NFET 304 has equivalent impedance $R_{NFET}$. A source $V_{TT}$ 308 supplies a voltage to a source terminal of the PFET 302, and a source terminal of the NFET 304 is pulled to electrical ground $V_{SS}$ 310. Drain terminals of the FET's 302 and 304 are coupled through a PFET drain resistor ($R_P$) 312, which is in electrical communication with the drain terminal of the PFET 302, and an NFET drain resistor ($R_N$) 314, which is in electrical communication with the drain terminal of the NFET 304. An input 306 ("1" or "0") is provided to the gate terminals of the FETs 302 and 304. The gate terminal of the PFET 302 and gate terminal of the NFET 304 receive the input signal 306. The voltage divider formed by the TX 202 and the load resistance $R_L$ of termination network 210 provides an output ($V_O$) 316. The output $V_O$ 316 is terminated into a load resistance $R_L$ of termination network 210 and $V_{RXTERM}$.

In FIG. 3, TX 202 includes an inverting complementary metal oxide (CMOS) semiconductor (CMOS) driver circuit with controlled output impedance. When the input 306 is "1" ($V_{TT}$), the output $V_O$ 316 is pulled low by the NFET 304. When the input 306 is "0" ($V_{SS}$), the output $V_O$ 316 is pulled high by the PFET 302. As such, the PFET 302 is on when the PFET gate voltage is $V_{SS}$ 310, and the NFET 304 is on when the NFET gate voltage is $V_{TT}$ 308. The pull-up impedance is a sum of the impedance $R_{PFET}$ of the PFET 302 and the drain resistor $R_P$ 312, and the pull down impedance is a sum of the impedance $R_{NFET}$ of the NFET 304 and the drain resistor $R_N$.

As such, when the input 306 is $V_{TT}$ 308, the PFET 302 is "OFF," the NFET 304 is "ON" and the output impedance is $R_{NFET}+R_N$, and when the input 306 is $V_{SS}$ 310, the NFET 304 is "OFF," the PFET 302 is "ON," and the output impedance is $R_{PFET}+R_P$.

For $|V_{GS}|=V_{TT}$ and $|V_{DS}|<|V_{GS}|$, FET current $I_{DS}=K*V_{EFF}*V_{DS}-(V_{DS})^2/2$, where $V_{GS}$ is the gate-source voltage, $V_{DS}$ is the drain-source voltage, where K is the fixed gain coefficient, $V_{EFF}$ is $V_{GS}-V_{TH}$, $V_{TH}$ is the FET threshold voltage, and $V_{EFF}$ is fixed for the steady-state condition of input $V_{SS}$ or $V_{TT}$. The PFET source voltage $V_S$ is $V_{TT}$ 308, the PFET drain voltage $V_D$ is $V_{DP}$, and the PFET drain-source voltage $V_{DSP}=V_{TT}-V_{DP}$. The NFET source voltage $V_S$ is $V_{SS}$ 310, the NFET drain $V_D$ voltage $V_{DN}$, and the NFET drain-source voltage $V_{DSN}=V_{DN}$.

The "ON" resistance of a FET is by definition inversely proportional to the absolute value of the source-drain current $I_{DS}$. As such, the FET resistances $R_{NFET}$ and $R_{PFET}$ are a function of their respective drain voltages. The drain voltages $V_{DP}$ and $V_{DN}$, are derived from network analysis as described below. Assume $R_P \approx R_N \approx R$. For an input 306 of $V_{SS}$ ($V_{GP}=V_{SS}$), the PFET drain voltage $V_{DP}=V_{TT}-(V_{TT}-V_{RXTERM})*(R_{PFET}+R)/(R_L+R_{PFET}+R)$. For an input of $V_{TT}$ ($V_{GN}=V_{TT}$), the NFET drain voltage $V_{DN}=V_{RXTERM}*(R_{NFET}+R)/(R_L+R_{PFET}+R)$.

When $V_{RXTERM}$ varies, $V_{DP}$ and $V_{DN}$ vary proportionally. As a direct consequence, the impedances $R_{PFET}$ and $R_{NFET}$ vary with $V_{RXTERM}$. The drain voltages across $R_{PFET}$ and $R_{NFET}$ are matched for a fixed termination voltage $V_{RXTERM}$, which can be determined by $V_{DSN}=-V_{DSP}$. Under this condition, the drain-source current $I_{DSN}$ of the NFET 304 is equal to the source-drain current $I_{SDP}$ of the PFET 302. Note that $I_{DSN}$ flows from its positive terminal to its negative terminal, and $I_{SDP}$ flows from its positive terminal to its negative terminal.

Assuming $R_{PFET}=R_{NFET}$ and $R_{NFET}+R=R_L$, the equality $V_{DSN}=-V_{DSP}$ can be written as $V_{RXTERM}=V_{TT}/2$. This is shown in greater detail next: $V_{DSN}=-V_{DSP}$; $V_{RXTERM}*(R_{NFET}+R)/(R_L+R_{NFET}+R)=V_{DP}=V_{TT}-(V_{TT}-V_{RXTERM})*(R_{NFET}+R)/(R_L+R_{PFET}+R)-V_{TT}$; $V_{RXTERM}/(2R_L)*R_{ON}=-[V_{TT}-(V_{TT}-V_{RXTERM})/(2*R_L)R_{ON} \rightarrow V_{TT}]$; $V_{RXTERM}=V_{TT}-V_{RXTERM}$; and $V_{RXTERM}=V_{TT}/2$. It is to be understood that the above is just one non-limiting example for a given proportion of $R_{PFET}$, $R_{NFET}$, R, and $R_L$. Regardless of the resistance values, only one termination voltage will satisfy the equality $V_{DSN}=-V_{DSP}$. As such, only one termination voltage will give equal $R_{PFET}$ and $R_{NFET}$.

As noted above, when $V_{RXTERM} \approx V_{TXCM}$, the absolute value of the average $I_{CM} \approx 0$. As a consequence, the common-mode noise $V_{NCM}$ of the signals $V_P$ and $V_N$ can be reduced or minimized. In general, $V_{NCM}$ is the instantaneous movement on the average of the TX output signals $(V_P+V_N)/2$. Ideally for differential signals, the AC portions of the signals $V_P$ and $V_N$ are substantially exactly opposite, or AC $V_P \approx -V_N$, so that the average $(V_P+V_N)/2$ is only the DC $V_{NCM}$. Note that $V_{P/N}$=AC $V_{P/N}$+DC $V_{P/N}$=AC $V_{P/N}+V_{NCM}$. However, $V_P$ and $V_N$ may differ by an undesirable amount due to differences in a time delay between the two signals or differences in rise and fall times.

For a SST driver, the output impedance of the pull-up portion (PFET 302) matches the output impedance of the pull down portion (NFET 304) only for a small range of $V_{TXCM}$. If $V_{TXCM}$ is outside this range, the voltage across the PFET 304 portion differs from the voltage across the NFET 304 portion such that the FET impedance ($R_{DS}$) is substantially different for the PFET 302 and the NFET 304. The rise time of the output $V_O$ 316 signals is set by the impedance of the pull-up portion, and the fall time of the output $V_O$ 316 is set by the pull down portion impedance. Thus, the rise time will not match the fall time of the output signal $V_O$ 316 if $V_{TXCM}$ is outside the ideal range. This rise-time/fall-time mismatch leads to common mode voltage noise $V_{NCM}$.

Figure 4:
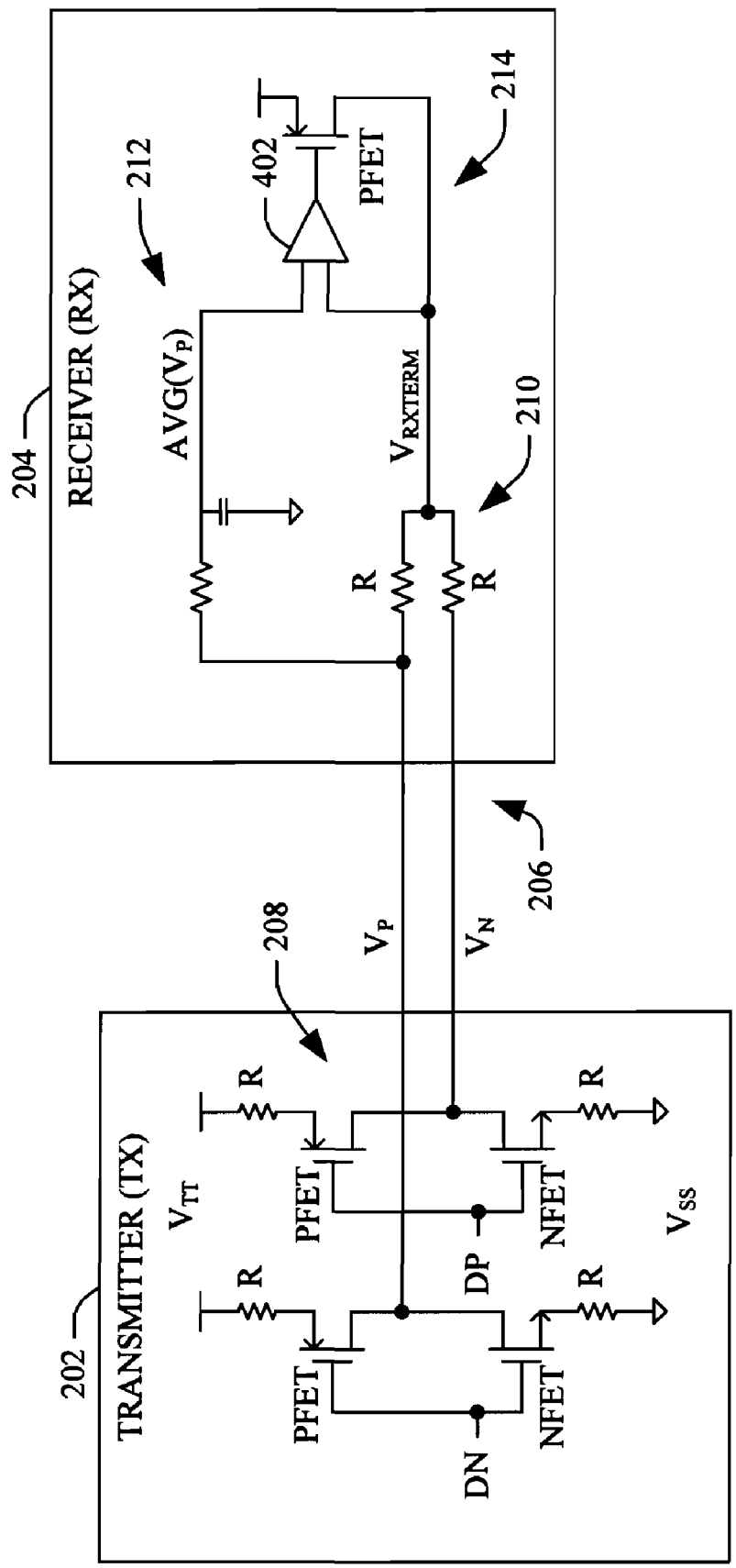

FIG. 4 illustrates another example schematic circuit for the communications system 200. In this example, the driver 208 is a differential driver and is self-series terminated (SST). The voltage regulator 214 includes an amplifier 402 that receives an average of the $V_P$ (AVG($V_P$)) as a first input signal and $V_{RXTERM}$ as a second input signal. As noted above, the voltage measurement circuit 212 determines AVG($V_P$). The amplifier 402 generates a subsequent $V_{RXTERM}$(based on AVG($V_P$)) which is fed back to the second input of the amplifier 402 to increase or decrease the $V_{RXTERM}$ such that $V_{RXTERM}$ remains approximately equal to AVG($V_P$) at the termination network 210.

For the illustrated example, the circuit operation for $V_P > V_N$ (TX 202 output signal="1"; $V_P \rightarrow V_P$ (1); $V_N \rightarrow V_N$ (1)) and for $V_P < V_N$ (TX 202 output signal="0"; $V_P \rightarrow V_P$ (0); $V_N \rightarrow V_N$ (0)) for $V_{RXTERM} = V_{TT}/2$ is described. The average of $V_P$ and $V_N$, or the instantaneous common-mode voltage for the system, can be determined AVG($V_P$(1), $V_N$(1))=AVG($V_P$ (1), $V_P$(0))=[$V_{TT}$−($V_{TT}$−$V_{RXTERM}$)/2+$V_{RXTERM}$/2]/2=[$V_{TT}$/2+$V_{RXTERM}$]/2=$V_{TT}$/4+$V_{RXTERM}$/2, where $V_P$(1)=$V_{TT}$−$I_P$*R=$V_{TT}$−($V_{TT}$−$V_{RXTERM}$)/2R*R, and $V_N$(1)=$I_N$*R=$V_{RXTERM}$/2R*R. When $V_{RXTERM} > V_{TT}/2$, the AVG($V_P$)>$V_{TT}$/4+($V_{TT}$/2)/2 and $V_{TT}$/4+($V_{TT}$/2)/2>$V_{TT}$/2, and $V_{RXTERM}$ will be decreased via feedback from the amplifier. However, when $V_{RXTERM} < V_{TT}/2$, the AVG($V_P$)<$V_{TT}$/4+($V_{TT}$/2)/2 and <$V_{TT}$/4+($V_{TT}$/2)2<$V_{TT}$/2, $V_{RXTERM}$ will be increased. For $V_{RXTERM} = V_{TT}/2$, the AVG($V_P$) (or AVG($V_N$)) is $V_{TT}/2$, and $V_{RXTERM}$ and $V_{RXTERM}$ substantially match.

When matched, the feedback loop is at equilibrium, and substantially no DC current should exist between TX 202 and RX 204. Although the above is described in connection with a SST driver, it is to be understood that other topologies such as a current-mode logic (CML) topology or other topology are also contemplated. A similar approach can be used for current-mode logic (CML) transmitter topologies.

Figure 5:
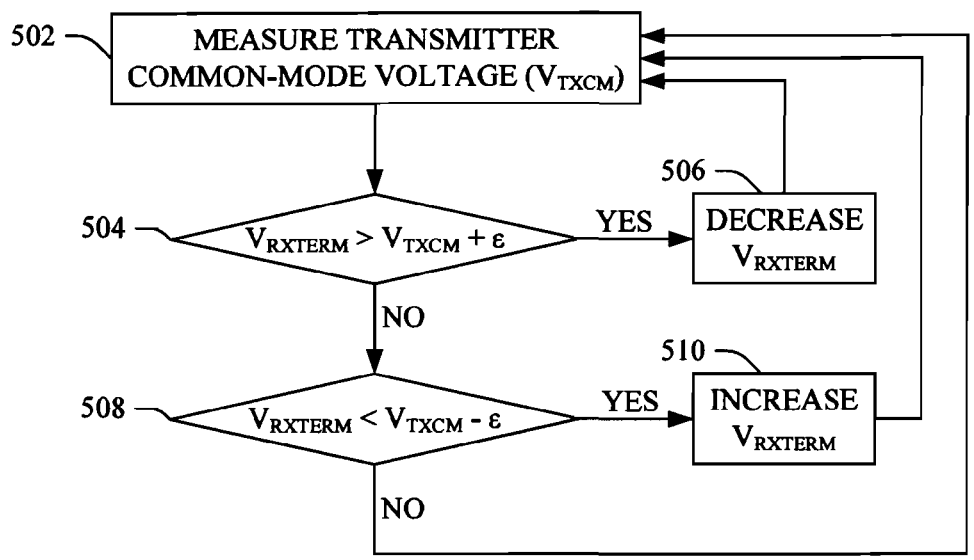
FIG. 5 illustrates a method for matching the common-mode voltage of a receiver with the common-mode voltage of the transmitter.

FIG. 5 illustrates a method for matching the common-mode voltage of a transmitter and receiver. At 502, measure the common-mode voltage of the transmitter ($V_{TXCM}$). As described herein, the measurement can be the average of the voltage on the incoming voltage signal(s). At 504, it is determined whether the common-mode voltage of the receiver ($V_{RXTERM}$) is greater than a first threshold voltage (a summation of the common-mode voltage of the transmitter ($V_{TXCM}$) and a tolerance ($\epsilon$)). At 506, if so, then the common-mode voltage of the receiver is suitably decreased so that it falls below the first threshold voltage. The process then returns to step 502.

However, if the common-mode voltage of the receiver is not greater than the first threshold voltage, then at 508 it is determined whether the common-mode voltage of the receiver is less than a second threshold voltage (a summation of the common-mode voltage of the transmitter and a negative tolerance). At 510, if so, then the common-mode voltage of the receiver is suitable increased so that it rises below the second threshold voltage, and the process then returns to step 502. At 510, if not, the process the returns to step 502.

Alternatively, the process may begin by determining whether the common-mode voltage of the receiver is less than the second threshold voltage and then, if needed, determining whether the common-mode voltage of the receiver is greater than the first threshold voltage. Other approaches are also contemplated. For example, the common-mode current may alternatively be measured and used to set the common-mode voltage of the receiver. It is to be appreciated that the frequency of such comparisons may be continuous, periodic, aperiodic, on demand, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method, comprising:
   measuring, at a receiver of a high-speed direct current (DC) serial connection, a common-mode voltage of a transmitter transmitting over the high-speed DC serial connection, wherein the common-mode voltage of the transmitter is an average of a voltage signal transmitted by the transmitter and received by the receiver;
   comparing the common-mode voltage of the transmitter with a common-mode termination voltage of the receiver;
   determining a feedback signal based on a difference between the common-mode voltage of the transmitter and the common-mode termination voltage of the receiver; and
   using the feedback signal to maintain the common-mode termination voltage of the receiver within a preset voltage range at which the common-mode voltage of the receiver substantially matches the common-mode voltage of the transmitter, wherein the preset range is the average of the voltage signal transmitted by the transmitter and received by the receiver plus/minus a tolerance.

2. The method of claim 1, further including:
   measuring, at the receiver, a common-mode current of a termination circuit of the receiver that is receiving the voltage signal; and
   maintaining the common-mode current at a level at which the common-mode current approximately equals zero.

3. The method of claim 1, wherein the maintained common-mode voltage of the receiver is maintained at a second level at which common-mode noise between the transmitter and the receiver is minimized.

4. A high-speed direct current (DC) serial link receiver, comprising:
   a serial link termination circuit;
   a voltage measurement component that measures a common-mode voltage corresponding to a transmitted signal (s) received at the serial link termination circuit; and
   a voltage regulator that regulates a termination voltage of the serial link termination circuit based on the measured common-mode voltage;
   wherein the voltage regulator includes a feedback circuit that provides feedback that maintains the termination voltage within a preset voltage range; and
   wherein the preset range is an average of the received signal(s) plus/minus a tolerance.

5. The receiver of claim 4, wherein the voltage regulator includes a comparator that compares the measured common-mode voltage with the termination voltage.

6. The receiver of claim 4, wherein an output of the comparator is used to increase and decrease the termination voltage.

7. The receiver of claim 6, wherein the output of the comparator increases the termination voltage when the termination voltage is less than a summation of the measured common-mode voltage and a first tolerance.

8. The receiver of claim 6, wherein the output of the comparator decreases the termination voltage when the termination voltage is greater than a summation of the measured common-mode voltage and a second tolerance.

9. The receiver of claim 6, wherein the output of the comparator adjusts the termination voltage so that the termination voltage substantially matches the measured common-mode voltage within a tolerance range.

10. The receiver of claim 6, wherein the output of the comparator adjusts the termination voltage so that an absolute value of an average of a common-mode current at the serial link termination circuit is about zero.

11. The receiver of claim 6, wherein the voltage measurement component computes an average voltage of the signal(s) to determine the measured common-mode voltage.

12. The receiver of claim 4, wherein the serial link termination circuit includes a single-ended termination circuit, and the signal(s) is a single-ended signal.

13. The receiver of claim 4, wherein the serial link termination circuit includes a differential termination circuit, and the signal(s) includes two differential signals.

14. The receiver of claim 4, wherein the signal(s) is obtained from a self series terminated driver.

15. The receiver of claim 4, wherein the signal(s) is obtained from a current-mode logic based driver.

16. A high-speed direct current (DC) serial link receiver apparatus, comprising:
a serial link termination circuit that receives data serially transmitted over a high speed direct current (DC) serial link;
a first circuit that determines an instantaneous average voltage of the data;
a second circuit, including an amplifier that:
receives the determined instantaneous average voltage as a first input; and
receives a termination voltage of the serial link termination circuit as a second input signal, wherein the amplifier generates an output voltage signal based on a difference between the determined instantaneous average voltage and the termination voltage, wherein the output voltage signal is fed back to the second input to increase or decrease the termination voltage at the second input to a level that is the voltage level of the determined instantaneous average voltage at the first input plus/minus a tolerance.

17. The apparatus of claim 16, wherein the increase or decrease of the termination voltage is to a voltage level at which substantially no direct current exists between the receiver and a transmitter transmitting the data.

18. The apparatus of claim 17, further comprising:
a driver that drives the received data serially transmitted over the high speed direct current (DC) serial link, wherein the driver comprises:
a negative field effect transistor comprising a source terminal pulled to an electrical ground; and
a positive field effect transistor comprising a source terminal receiving a supply voltage from a source;
wherein drain terminals of the negative and positive field effect transistors are coupled through drain resistors; and
wherein the driver drives the received data serially transmitted over the high speed direct current (DC) serial link in response to an input signal "1" or "0" provided to gate terminals of the negative and positive field effect transistors, the driven data terminated into a load resistance of the termination voltage.

19. The apparatus of claim 18, wherein the driver further comprises:
an inverting complementary metal oxide (CMOS) semiconductor (CMOS) driver circuit with controlled output impedance;
wherein the data driven by the driver is an output voltage signal that is pulled low by the negative field effect transistor when the input signal is "1" and is pulled high by the positive field effect transistor when the input signal is "0"; and
wherein a pull-up impedance is a sum of an impedance of the positive field effect transistor and the positive field effect transistor drain resistor, and a pull down impedance is a sum of an impedance of the negative field effect transistor and the negative field effect transistor drain resistor.

* * * * *